Nov. 12, 1963

A. E. PLOGSTEDT ET AL 3,110,851

TRANSISTOR SERVO SYSTEM

Filed Aug. 26, 1960

INVENTORS.
ALLEN E. PLOGSTEDT.
BY RICHARD W. BRADMILLER.

ATTORNEYS.

INVENTORS.
ALLEN E. PLOGSTEDT.
BY RICHARD W. BRADMILLER.
ATTORNEYS.

Patented Nov. 12, 1963

3,110,851
TRANSISTOR SERVO SYSTEM
Allen E. Plogstedt, Cincinnati, Ohio, and Richard W. Bradmiller, Winter Park, Fla., assignors to Avco Corporation, Cincinnati, Ohio, a corporation of Delaware
Filed Aug. 26, 1960, Ser. No. 52,268
8 Claims. (Cl. 318—28)

This invention relates to a second order, automatic servo means for phase correction and, more particularly, to a system incorporating a unique electrical feedback for modulating the error signals whereby an automatic null-seeking servo is provided.

Briefly described, this servo system incorporates an error-generating bridge, a unique servo amplifier, and a reversible motor energized by the output of the servo amplifier for balancing the bridge in response to errors. In addition, a novel feedback loop is provided in the servo amplifier for setting the system into oscillation, thereby modulating the error. As will be seen, this results in an automatic, null-seeking servo which is capable of achieving an extremely accurate null.

It is, therefore, the primary object of this invention to provide a servo system having the ability to digest data presented as position, velocity, or acceleration by incorporating self-contained modulation, double integration with respect to time, and loop stabilization means.

Another object of this invention is to provide a second order servo system having means for error-generating and balancing and incorporating electrical feedback circuitry simulating the operation of a mechanical inertial damper.

Another object of this invention is to provide a second order servo system having means for accurate homing or null return whether displaced by a position, velocity, or acceleration signal.

Another object of this invention is to provide a servo system incorporating automatic electrical damping.

Still another object of this invention resides in the provision of a servo system employing a novel electrical feedback circuitry which produces intertial damping to enhance smoothness and accuracy of operation.

The above and still further objects, features, and advantages of the present invention will become apparent upon consideration of the following detailed description, taken in conjunction with the acompanying drawings in which.

Figure 1:
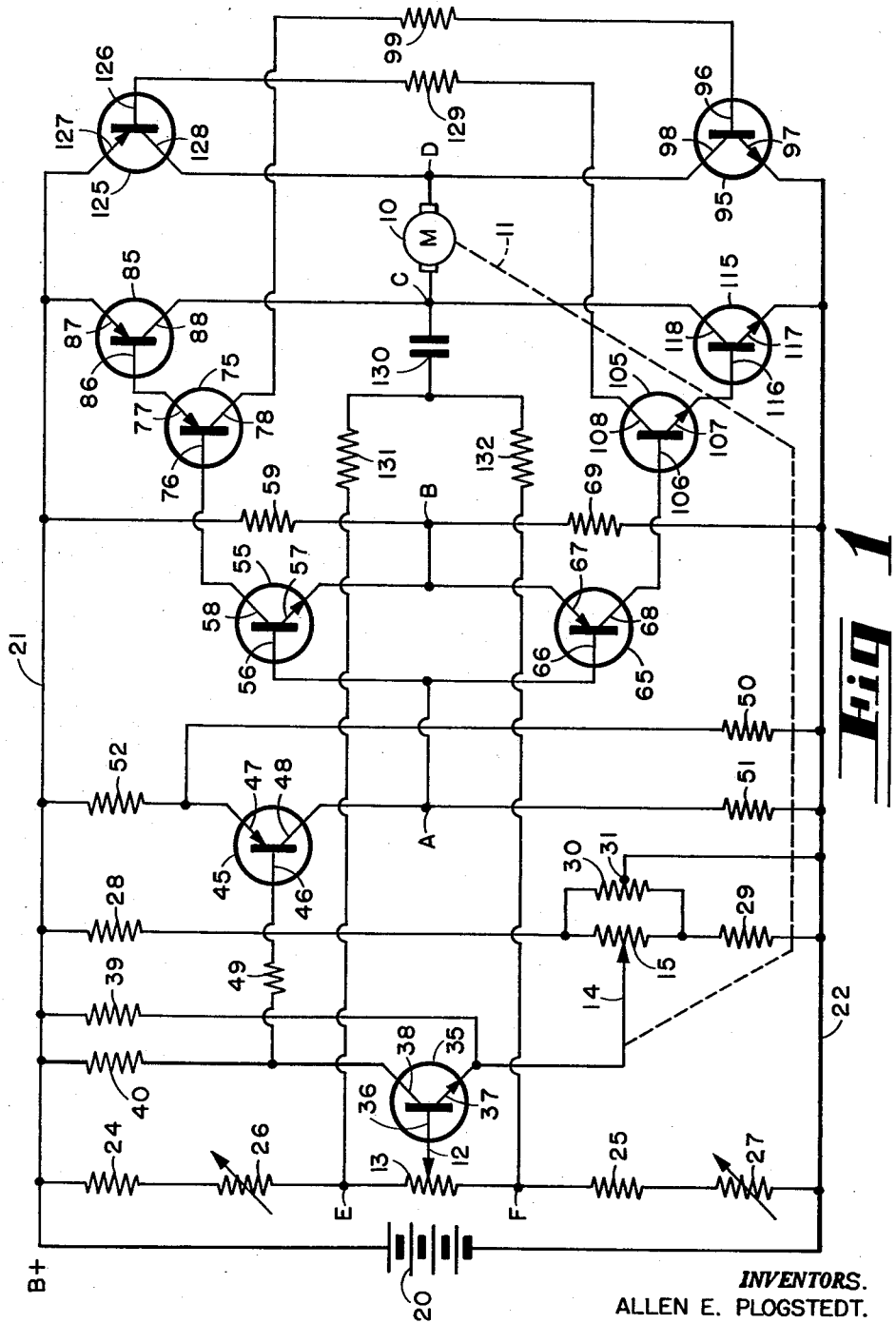
FIG. 1 is a schematic circuit diagram of a preferred servo system in accordance with this invention.

The servo system shown in FIG. 1 includes a reversible direct current servo motor 10 arranged for energization in a forward or reverse direction to produce a corresponding rotation of its shaft 11, depending on the direction of motion of the tap 12 of an error-generating potentiometer 13. The shaft 11 is coupled to the moveable tap 14 of an error-correcting potentiometer 15 to provide the required follow-up or nulling.

Energization for the entire system is provided by a single battery 20 or other suitable power source connected between a positive supply lead 21 and a negative supply lead 22. The potentiometer 13, in series with fixed resistors 24 and 25 and adjustable resistors 26 and 27, is connected between the leads 21 and 22. The potentiometer 15, in series with fixed resistors 28 and 29, is similarly connected. A fixed resistor 30 is connected across the potentiometer 15 and is connected to the negative lead 22 at a tap 31.

The potential difference existing between the moveable taps 12 and 14 provides the input to the first stage of amplification comprising an NPN type transistor 35 having a base electrode 36, an emitter electrode 37, and a collector electrode 38, the base 36 being connected to the tap 12, the emitter 37 being connected to the junction of the tap 14 and a resistor 39, and the collector electrode 38 being connected to the lead 21 through a resistor 40.

The voltage at collector 38 of transistor 35 provides the input to a second stage of amplification comprising a PNP type transistor 45 having a base 46 connected to the collector 38 through a resistor 49, an emitter 47, and a collecter 48. Fixed bias for the emitter 47 is provided by means of a voltage divider consisting of resistors 50 and 52 connected between the leads 21 and 22, the emitter 47 being connected to the junction between them. Collector bias is provided from the lead 22 through a resistor 51.

The amplified output from the collector 48 is then applied to a unique servo amplifier, the details of which are described in our copending application entitled "A Transistor Power Switch" filed on even date. However, while the circuitry in the copending application was used as an electronic switch with the various switching transistors operated either at cutoff or at saturation, in this application the transistors normally are not operated at saturation but are operated well below saturation during a nulling operation.

This unique servo amplifier includes an NPN type transistor 55 having a base 56, an emitter 57, and a collector 58 connected in complementary symmetry with a PNP type transistor 65 having a base 66, an emitter 67, and a collector 68; that is to say, the bases 56 and 66 are interconnected, as are the emitters 57 and 67, and base input is applied jointly, directly from the collector 48 of transistor 45. Emitter bias is applied from the junction of resistors 59 and 69 which provide a midpoint voltage between the leads 21 and 22.

It will be noted that the base-emitter input circuit to each of the transistors 55 and 65 is connected between the output terminals A and B of a four-leg bridge, including the resistor 49 and the emitter-collector junction of transistor 45 and resistor 52 in one leg, and the resistors 51, 59, and 69 in the remaining legs. Under proper operation conditions, when the voltage between terminals A and B is zero or some other finite value, depending on the operating characteristics of the transistors 55 and 65, neither transistor is rendered conductive. The parameters of resistors 24 and 27 are selected so as to establish the appropriate voltage at A when the tap 12 of potentiometer 13 is at the mid-point. The resistors 26 and 27 provide the fine adjustment, if required.

If the voltage at terminal A rises with respect to the voltage at terminal B, then the NPN type transistor 55 is rendered conductive, and current is driven from the collector 58 into the base input of an NPN type transistor 75 having a base 76, an emitter 77, and a collector 78. When this occurs, current is driven into the base input circuit of a PNP type transistor 85 having a base 86 connected directly to the emitter 77, an emitter 87 coupled directly to the positive lead 21, and a collector 88 connected to the terminal C of the motor 10; and simultaneously, current is driven into the base input circuit of an NPN type transistor 95 having a base 96 connected to the collector 78 through a current-limiting resistor 99, an emitter 97 connected to the negative lead 22, and a collector 98 connected directly to the terminal D of the motor 10.

If the voltage at terminal A falls with respect to the voltage at terminal B, then the PNP transistor 65 is rendered conductive, and current is driven from the collector 68 into the base input of an NPN type transistor 105 having a base 106, an emitter 107, and a collector 108. When this occurs, current is driven into the base input circuit of an NPN type transistor 115 having a base 116 directly connected to the lead 22, and a collector 118 connected to the terminal C; and simultaneously, current is driven into the base input circuit of a PNP type transistor 125 having a base 126 connected to the collector 108 through a current-limiting resistor 129, an emitter 127 connected to the lead 21, and a collector 128 connected directly to the motor terminal D.

Thus, when the tap 12 is displaced from a null position on the potentiometer 13, the voltage at terminal A will rise or fall with respect to terminal B, and current will flow through the motor 10 in one direction or in the opposite direction. This will cause rotation of the shaft 11 in a direction moving the tap 14 to a new null position.

Now the invention described to this point is a first order servo system containing a unique servo amplifier. As will be understood by persons skilled in the art, the accuracy of a first order system leaves much to be desired, and considerable hunting may result. To improve accuracy and avoid hunting we convert the first order servo system into a unique second order servo system by means of a novel regenerative feedback loop established by connections from the point C to one terminal E of potentiometer 13 through a condenser 130 and a resistor 131, and to the other terminal F of the potentiometer 13 through the condenser 130 and a resistor 132.

This novel regenerative feedback loop causes the several stages of the amplifier to oscillate at a frequency and level dependent on the magnitude of the error signal, i.e., the difference in voltage between the taps 12 and 14. In effect, the error signal is modulated by an oscillating voltage of variable magnitude and frequency, and then double-integrated with respect to time by the associated amplifier circuitry and the motor 10.

The voltage feedback from the point B is to either side E or F of the potentiometer 13, resulting in a regenerative action of variable extent. The oscillations which then occur are controlled in frequency and amplitude by the dynamic RC values of the amplifier. Note the point C may move up or down in voltage with respect to the base 36 of transistor 35 such that the feedback may be either regenerative or degenerative.

The oscillations are established at low frequency and amplitude adjacent the null, sufficient to create "dither" but insufficient to cause rotation of the shaft at the null position. At positions remote from the null, the oscillations are automatically at a higher frequency and amplitude. The frequency and amplitude of the modulation oscillations may be varied by changing the parameters in the feedback loops.

In the embodiment of this invention as reduced to practice, the magnitude of the peak excursions of the oscillations near the null actually exceeded the magnitude of the error signal, and hence the error signal was modulated positive and negative. It was discovered that such modulation, followed by a double integration with respect to time, produced an extremely accurate null with essentially no hunting; and, furthermore, continuous error correction is feasible whether the error signal be a direction signal, a magnitude signal, or the combination.

It was found that a sudden, severe unbalance of the system effectively provides a high voltage feedback source initiating regeneration in the amplifier to provide high gain with rapid closure adjustment. This regeneration, actually a relatively low-amplitude oscillation, tapered out with a corresponding frequency decrease as the system nulled in, and any tendency to overshoot immediately incurred a heavy negative feedback resulting in effective electrical damping. It will be noted that with an error signal sufficient to saturate the amplifier, oscillations will not result, but with the arrangement shown, the motor 10 will drive toward a null without damping until the transistors are unsaturated, at which time oscillations will commence. It will be recognized that this condition will rarely occur in practice, since there is very rapid following, and an error large enough to cause saturation would not occur unless manually set into the system with the battery 20 disconnected.

For a theoretical explanation of the results of inertial damping automatically produced by the system, reference may be made to pages 618 and 619 of Automatic Feedback Control System Synthesis by Truxal, published by McGraw-Hill, 1955. The phase-plane diagrams in this reference show the desirable positive and negative conditions for the damping action which is automatically achieved by the present invention.

While the present invention, as actually reduced to practice, involved the use of an electric motor for driving a follow-up potentiometer, it should be recognized that this is but one application of the invention and that the system can be made entirely electronic. The motor can be replaced by any current-carrying load suitable for driving any suitable error-correcting element. Under these circumstances, the error signal would preferably be applied from an error detector across potentiometer 13, and the load would be electrically coupled to the detector for effecting the necessary corrections.

Figure 2:
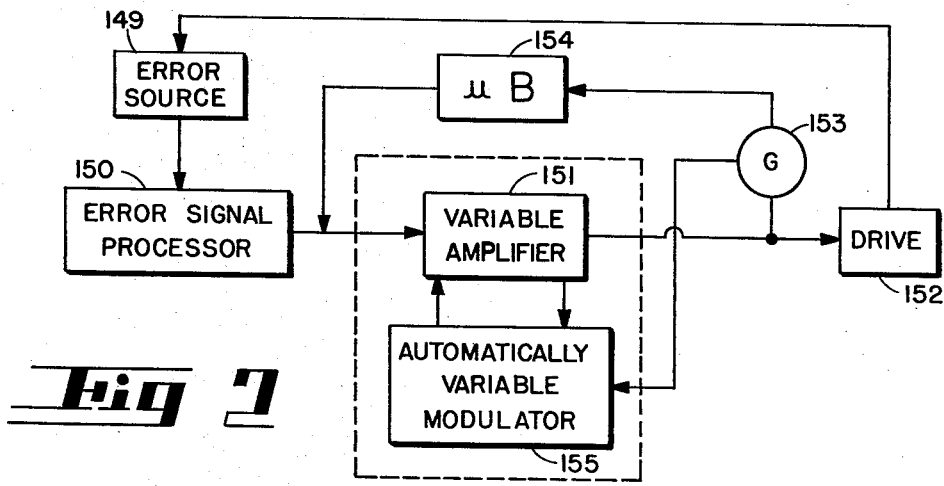
FIG. 2 is a simplified functional block diagram representing this invention.

Functionally, the servo system of this invention is illustrated in FIG. 2 in block diagram form. The output from an error source 149 is applied to an error signal processor 150 for producing a direct current signal. The direct current signal is then applied to a variable amplifier 151, the output of which is applied to a suitable drive 152. The output from the error signal processor 150 is equivalent to the direct current error signal of FIG. 1 which appears between the taps 12 and 14, while the drive 152 is equivalent to the motor 10. Note that the error signal need not contain both magnitude and direction, but the signal will null on magnitude data only.

The output of the drive 152 is, in turn, coupled to the error source 149 for effecting a null.

A feedback voltage generated at the output of the amplifier 151 by a source symbolically shown as a generator 153 is fed back through a feedback path 154 to the input of the amplifier. This feedback path is the functional equivalent of the regenerative path through the resistor 131 or the resistor 132 to the potentiometer 13, and the degenerative feedback path generally through the amplifier system.

A modulator 155, controlled by the generator 153, modulates the amplifier with oscillations that are automatically controlled in frequency and amplitude in accordance with the signal strength of the generator. This modulation action is a resultant of the feedback component derived from the variable amplifier feedback parameters in conjunction with amplifier output magnitude.

Modulation of the amplified error signals with an oscillating voltage tends to drive the system in one direction and then in the opposite direction. Because of the double integration with respect to time which results in the amplifier circuitry and in the drive, the system always tends to drive toward a null, the reversals in drive producing inertial damping causing the system to yield an extremely accurate null. In addition, the low-frequency, low-amplitude oscillations occurring at the null are insufficient in electromechanical applications to cause shaft rotation but are ideal for producing a very beneficial dither.

Figure 3:
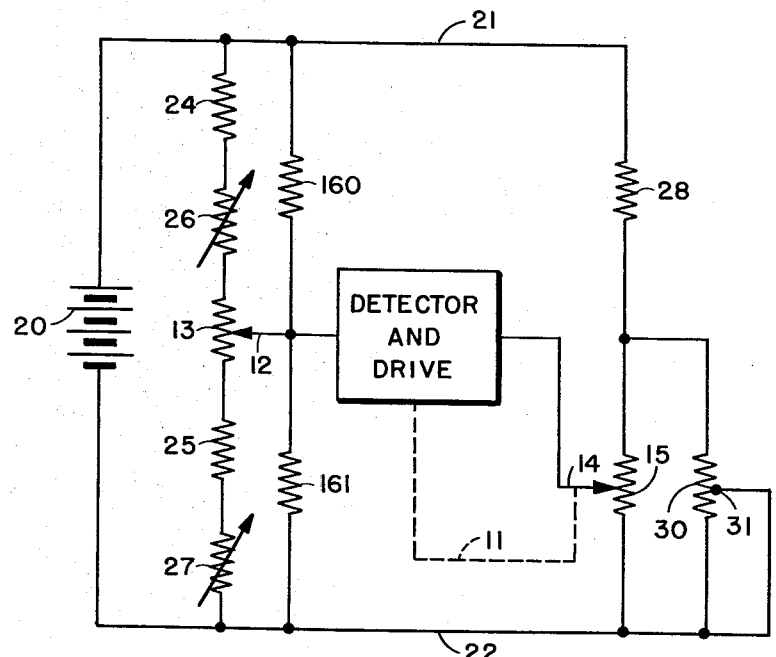
FIG. 3 represents a modification of this invention.
Figure 4:
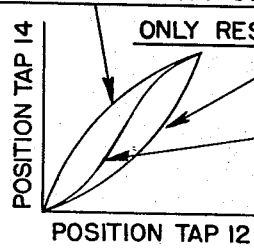
FIG. 4 shows curves illustrating the operation of FIG. 3.

The system of FIG. 1 is designed for yielding a linear response. However, by adding the resistors 160 and 161, as shown in FIG. 3, a non-linear response, such as shown in FIG. 4, may be obtained. (Note that the detector and drive block of FIG. 3 is equivalent to the amplifiers and motor of FIG. 1, and that the feedback loop is not indicated.) This modification was found to have considerable utility in computer applications. Various responses are also available by other modifications, and it will be recognized that this configuration may be conveniently used as a function generator.

While no limit is intended and while other parameters may be designed, the following parameters were used in a servo system actually reduced to practice:

| Potentiometers: | Ohms |
|---|---|
| 13 | 1K |
| 14 | 1K |
| Resistors: | |
| 24 | 220 |
| 25 | 560 |
| 26 | 200 |
| 27 | 200 |
| 28 | 470 |
| 29 | 470 |
| 30 (upper section) | 4.9K |
| 30 (lower section) | 375 |
| 39 | 1K |
| 40 | 12K |
| 49 | 4.7K |
| 50 | 2.2K |
| 51 | 5.6K |
| 52 | 390 |
| 59 | 4.7K |
| 69 | 4.7K |
| 99 | 330 |
| 129 | 330 |
| 131 | 280K |
| 132 | 470K |
| Condensers: 130 µf | .01 |

| Transistors: | Type |
|---|---|
| 35 | 905 |
| 46 | 2N188 |
| 55 | 2N35 |
| 65 | 2N34 |
| 75 | GT691 |
| 85 | 2N143 |
| 95 | 2N144 |
| 105 | GT692 |
| 115 | 2N144 |
| 125 | 2N143 |

| Batteries: 20 volts | 12 |
|---|---|

Having thus described our invention, many modifications and adaptations will become readily apparent to persons skilled in the art. It is, therefore, our intention that our invention be limited only by the following claims as interpreted in the light of the prior art.

What is claimed is:

1. In a servo system: means for producing reversible direct current error signals in response to deviations in a condition from a predetermined norm; error correcting means responsive to said error signals for restoring said condition to said predetermined norm; and means responsive to the magnitude of said error signal for modulating said error signals with an alternating current having a controlled periodicity and magnitude both dependent on the magnitude of said direct current error signals.

2. In a servo system, the combination comprising: an error potentiometer and a rebalancing potentiometer, each connected across a source of direct current, said error potentiometer including a first movable conductive tap and said rebalancing potentiometer including a second movable conductive tap; a wideband amplifier operatively biased by said source and having an input circuit and an output circuit, said input circuit being connected across said taps; a reversible direct current motor connected in the output circuit of said amplifier, said output circuit including means for energizing said motor from said source in one direction when the voltage at said first tap increases with respect to the voltage at said second tap, and from said source in the opposite direction when the voltage at said first tap decreases with respect to the voltage at said second tap; a negative feedback connection from said motor to said input circuit, said connection comprising a mechanical coupling between the shaft of said motor and said second tap; and a regenerative feedback connection from said output circuit to said input circuit whereby oscillations are set up in said amplifier, said oscillations having a frequency and amplitude dependent on the magnitude of voltage difference between said first and second taps.

3. The invention as defined in claim 2 wherein said output circuit of said amplifier comprises a bridge circuit including two sides connected in parallel, each of said sides including a pair of transistors of opposite conductivity types, each having base, emitter, and collector electrodes, the collector and emitter electrodes in each of said pairs being connected in series across said source, said motor being connected between the junctions of said collectors in each of said pairs of transistors; and wherein are provided means responsive to signals of one polarity for simultaneously rendering conductive a transistor of one conductivity in one of said pairs and a transistor of the opposite conductivity in the other of said pairs whereby said motor is energized from said source in one direction and responsive to signals of the opposite polarity for simultaneously rendering conductive the other of said transistors whereby said motor is energized from said source in the opposite direction.

4. The invention as defined in claim 3 wherein said regenerative feedback connection comprises an alternating current connection from one of said junctions to said error potentiometer.

5. In a servo system, the combination comprising: an error voltage generating source and a source of variable voltage rebalancing potential; a wide band amplifier having an input circuit and an output circuit; means for differentially applying said error voltage generating source and said source of variable voltage rebalancing potential across said input circuit; means for deriving an amplified voltage from said output circuit having a magnitude and polarity determined by the magnitude and polarity of the difference between the voltages of said sources; means responsive to said output voltage for adjusting said source of variable voltage rebalancing potential to reduce said difference; and means for modulating said difference voltage with an alternating current having a controlled periodicity and magnitude both dependent on the magnitude of said output voltage, said means comprising a regenerative feed-back connection from said output circuit to said input circuit whereby oscillations are set up in said amplifier.

6. In a servo system: means for producing reversible direct current error signals in response to deviations from a predetermined norm; an amplifier for amplifying said direct current error signals; and means for modulating said error signals with an alternating current having a controlled periodicity and magnitude both dependent on the magnitude of said direct current error signals, said means comprising a regenerative feed-back connection from the output of said amplifier to the input of said amplifier.

7. The invention as defined in claim 6 wherein said regenerative connection is capacitive.

8. A servo system comprising: an error generating network including an electromechanical error device for producing a direct voltage error signal; and an electromechanical rebalancing device for producing a direct voltage rebalancing signal for balancing out said error signal; a polarity sensitive electromechanical feedback device having a mechanical output coupled to said rebalancing device; an electronic direct current amplifier for amplifying said error signal, said amplifier having an input circuit supplied with said amplified error voltage and an output circuit coupled to said electromechanical feedback device for energizing said feedback device, said amplifier producing an output voltage having a magnitude and polarity dependent on the relative magnitudes of said error rebalancing signals; and a regenerative electronic feedback loop capacitively coupling the output circuit of said amplifier to the input circuit of said amplifier, whereby said amplifier oscillates when said error signal approaches zero, and said error voltage is modulated with an alternating current having a magnitude and frequency both dependent on the magnitude of said error voltage.

References Cited in the file of this patent
UNITED STATES PATENTS

| | | |
|---|---|---|
| 2,766,412 | Stephenson | Oct. 9, 1956 |
| 2,915,689 | Popowsky | Dec. 1, 1959 |
| 2,954,514 | Hemstreet | Sept. 27, 1960 |